United States Patent
Kawai et al.

(10) Patent No.: US 8,796,582 B2
(45) Date of Patent: Aug. 5, 2014

(54) LASER WELDING APPARATUS AND METHOD

(75) Inventors: Hitoshi Kawai, Atsugi (JP); Yuji Hamaguchi, Isehara (JP); Tatsuya Sakurai, Yokohama (JP)

(73) Assignees: Nissan Motor Co., Ltd., Yokohama-shi (JP); Showa Optronics Co., Ltd., Tokyo (JP)

( * ) Notice: Subject to any disclaimer, the term of this patent is extended or adjusted under 35 U.S.C. 154(b) by 1232 days.

(21) Appl. No.: 11/348,552

(22) Filed: Feb. 7, 2006

(65) Prior Publication Data

US 2007/0193984 A1   Aug. 23, 2007

(30) Foreign Application Priority Data

Feb. 8, 2005   (JP) ................................. 2005-032094

(51) Int. Cl.
  *B23K 26/00*  (2014.01)
  *G02B 7/02*   (2006.01)

(52) U.S. Cl.
  USPC ............ 219/121.63; 219/121.75; 219/121.78; 219/121.6; 219/121.61; 219/121.73; 359/822; 359/823; 359/824; 359/825; 359/826

(58) Field of Classification Search
  USPC ............... 219/121.63, 121.75, 121.78, 121.6, 219/121.61, 121.73, 121.74, 121.79; 359/822–826
  See application file for complete search history.

(56) References Cited

U.S. PATENT DOCUMENTS

| | | | | |
|---|---|---|---|---|
| 2,407,511 A | * | 9/1946 | Peck | 359/823 |
| 3,383,491 A | * | 5/1968 | Muncheryan | 219/121.63 |
| 3,392,261 A | * | 7/1968 | Schollhammer | 219/121.6 |
| 4,357,085 A | * | 11/1982 | Niwa et al. | 396/80 |
| 4,496,217 A | * | 1/1985 | Aoyagi | 359/823 |
| 4,839,495 A | * | 6/1989 | Kitera et al. | 219/121.63 |
| 4,997,250 A | * | 3/1991 | Ortiz, Jr. | 385/33 |

(Continued)

FOREIGN PATENT DOCUMENTS

| EP | 0429368 A1 | 5/1991 |
|---|---|---|
| EP | 1228835 A1 | 8/2002 |

(Continued)

OTHER PUBLICATIONS

JP09_192869A_1997.pdf machine translation.*

(Continued)

*Primary Examiner* — Dana Ross
*Assistant Examiner* — Ket D Dang
(74) *Attorney, Agent, or Firm* — Foley & Lardner LLP

(57) ABSTRACT

A laser welding apparatus includes a laser welding unit including a first lens adapted to focus a laser beam; a second lens adapted to diffuse the laser beam to the first lens; and a third lens adapted to guide the laser beam to the second lens. The relative positions of the first lens, the second lens, and the third lens, are adjusted to adjust a diffusion angle and a beam width of the laser beam entering the first lens. The laser welding apparatus performs: actuating the laser welding unit to travel at a predetermined speed along a predetermined trajectory; directing the laser beam at a first welding spot; adjusting the focal length to focus the laser beam at the first welding spot; holding the laser focal spot size substantially constant; and directing the laser beam at a second welding spot after completion of welding for the first welding spot.

17 Claims, 12 Drawing Sheets

(56) References Cited

U.S. PATENT DOCUMENTS

| | | | |
|---|---|---|---|
| 6,100,497 A | 8/2000 | Maruyama et al. | |
| 6,770,839 B2 * | 8/2004 | Mangiarino et al. | 219/121.63 |
| 7,151,788 B2 | 12/2006 | Imakado et al. | |
| 2001/0045419 A1 | 11/2001 | Dunsky et al. | |
| 2005/0150876 A1 * | 7/2005 | Menin et al. | 219/121.63 |

FOREIGN PATENT DOCUMENTS

| | | | | |
|---|---|---|---|---|
| EP | 1568436 A1 | 8/2005 | | |
| EP | 1600244 A1 * | 12/2005 | | 219/121.63 |
| JP | 61074794 A * | 4/1986 | | B23K 26/14 |
| JP | 8-19881 A | 1/1996 | | |
| JP | 9-192869 A | 7/1997 | | |
| JP | 09192869 A * | 7/1997 | | B23K 26/08 |
| JP | 2000-84689 A | 3/2000 | | |
| JP | 3229834 B2 | 9/2001 | | |
| JP | 2003-200286 A | 7/2003 | | |
| JP | 2004-050246 A | 2/2004 | | |

OTHER PUBLICATIONS

"Fiber Elephant," No. 0002243-01, Arges GmbH, Jun. 2003.

* cited by examiner

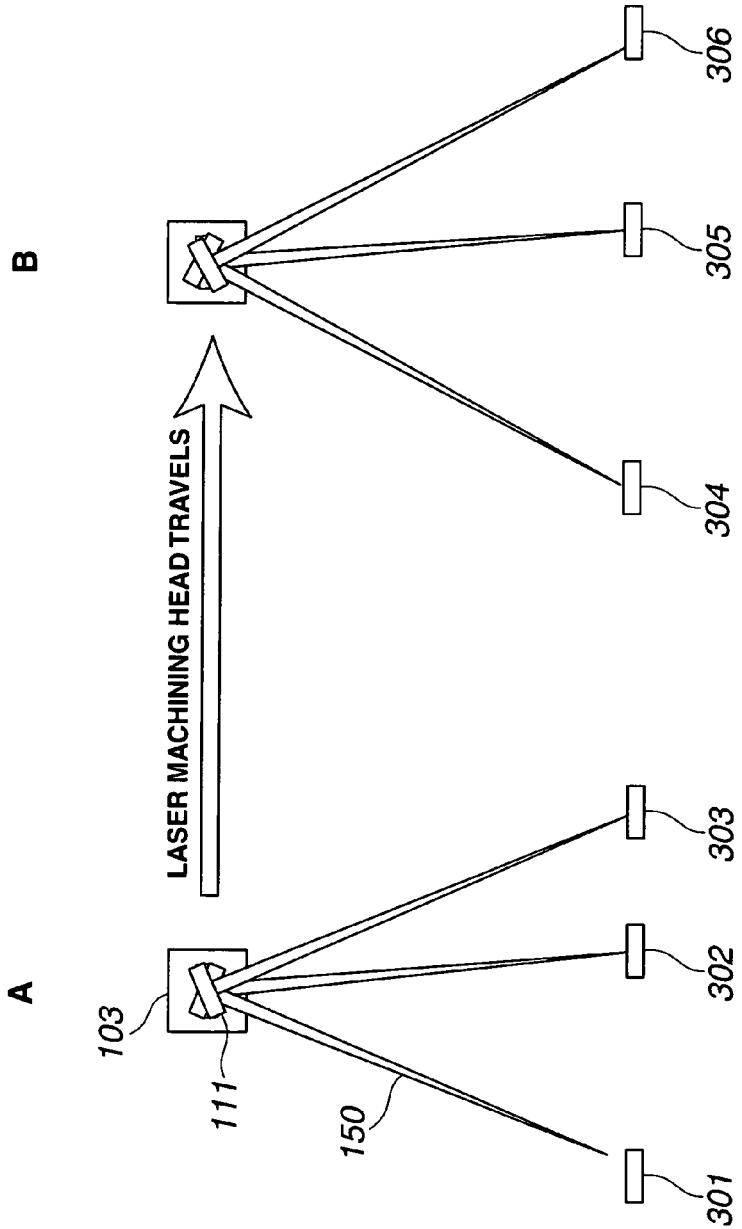

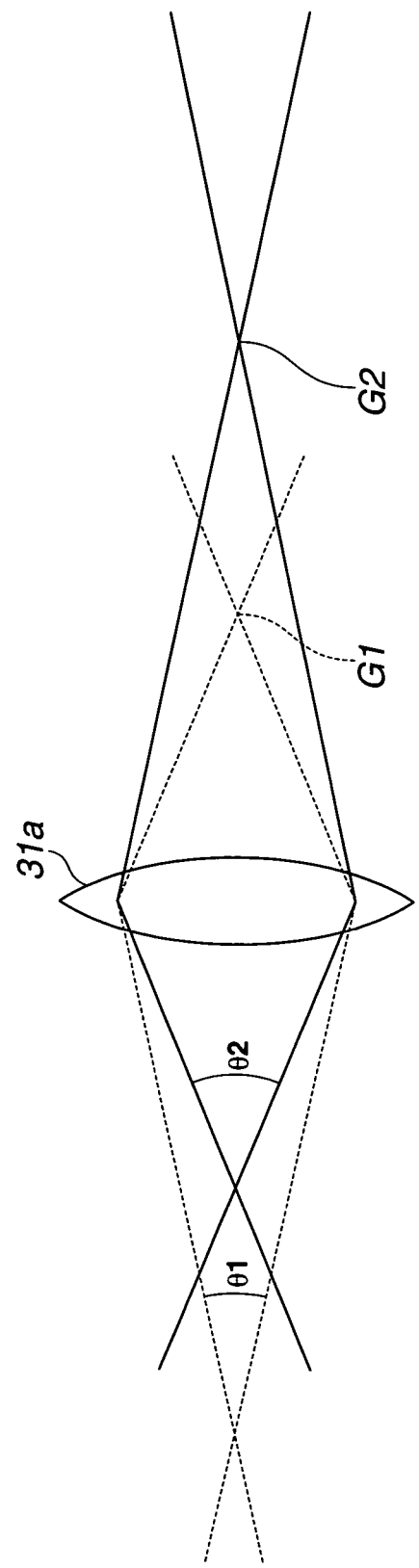

LASER WELDING APPARATUS AND METHOD

BACKGROUND OF THE INVENTION

The present invention relates to laser welding apparatus and method.

In recent years, laser welding is increasingly applied to robot welding. A Japanese Patent No. 3229834 shows such a laser welding technique of holding stationary a laser welding device attached to the tip of a robotic arm, and rotating a reflector inside the laser welding device to distribute a laser beam to each of a plurality of welding spots.

There is shown a laser welding technique of adjusting the focal length of a laser beam in accordance with different distances from a laser welding device to a is plurality of welding spots, in the datasheet of "FIBER ELEPHANT," Number 0002243-01, published by ARGES GmbH, June 2003. If the focal length is adjusted by this laser welding technique, the spot size of the laser beam at focus changes with a change in the focal length. As a result, the amount or density of focused optical energy varies in accordance with the focal length. Accordingly, it may be necessary to adjust the time period of laser irradiation for each welding spot separately.

A Published Japanese Patent Application No. 2004-050246 shows a laser welding technique of holding the laser spot size at welding spot substantially constant between welding spots in order to cancel the differences in the laser focal spot size caused by a change in the laser focal length. This laser welding technique changes the laser focal length independently of the distance to each welding spot in such a manner that the laser spot size at welding spot is constant between welding spots, using a point apart from focus.

SUMMARY OF THE INVENTION

In the above-mentioned technique of using a point apart from the focal point of a laser beam, it is impossible to fully use the highest energy density of the laser beam obtained at the focal point.

Accordingly, it is an object of the present invention to provide a laser welding apparatus and method for adjusting the focal point of a laser beam and the spot size of the laser beam at focus.

According to one aspect of the present invention, a laser welding apparatus comprises a laser welding unit comprising: a laser focusing section arranged to focus a laser beam; and a focus adjusting section arranged to adjust a focal length of the laser beam to focus the laser beam at a desired focal point, and arranged to adjust a laser focal spot size of the laser beam as desired. The laser welding unit may further comprise a laser distributing section arranged to adjust a relative direction of travel of the laser beam exiting the laser focusing section. The laser welding apparatus may further comprise: an actuator configured to actuate the laser welding unit to travel; and a control unit connected for signal communication to the laser welding unit and the actuator, and configured to perform the following: actuating the laser welding unit to travel at a predetermined speed along a predetermined trajectory; directing the laser beam at a first welding spot; adjusting the focal length to focus the laser beam at the first welding spot; holding the laser focal spot size substantially constant; and directing the laser beam at a second welding spot after completion of welding for the first welding spot.

According to another aspect of the invention, a laser welding method of controlling the laser welding apparatus, comprises: actuating the laser welding unit to travel at a predetermined speed along a predetermined trajectory; directing the laser beam at a first welding spot; adjusting the focal length to focus the laser beam at the first welding spot; holding the laser focal spot size substantially constant; and directing the laser beam at a second welding spot after completion of welding for the first welding spot.

According to a further aspect of the invention, a laser welding apparatus comprises: laser focusing means for focusing a laser beam; and focus adjusting means for adjusting a focal length of the laser beam to focus the laser beam at a desired focal point, and arranged to adjust a laser focal spot size of the laser beam as desired.

BRIEF DESCRIPTION OF THE DRAWINGS

FIG. 10 is a view showing an operation of laser welding by a reference laser welding technique.

FIG. 12 is a view showing a general relationship between the refraction and the focal length in a convex lens.

DETAILED DESCRIPTION OF THE INVENTION

Figure 1:
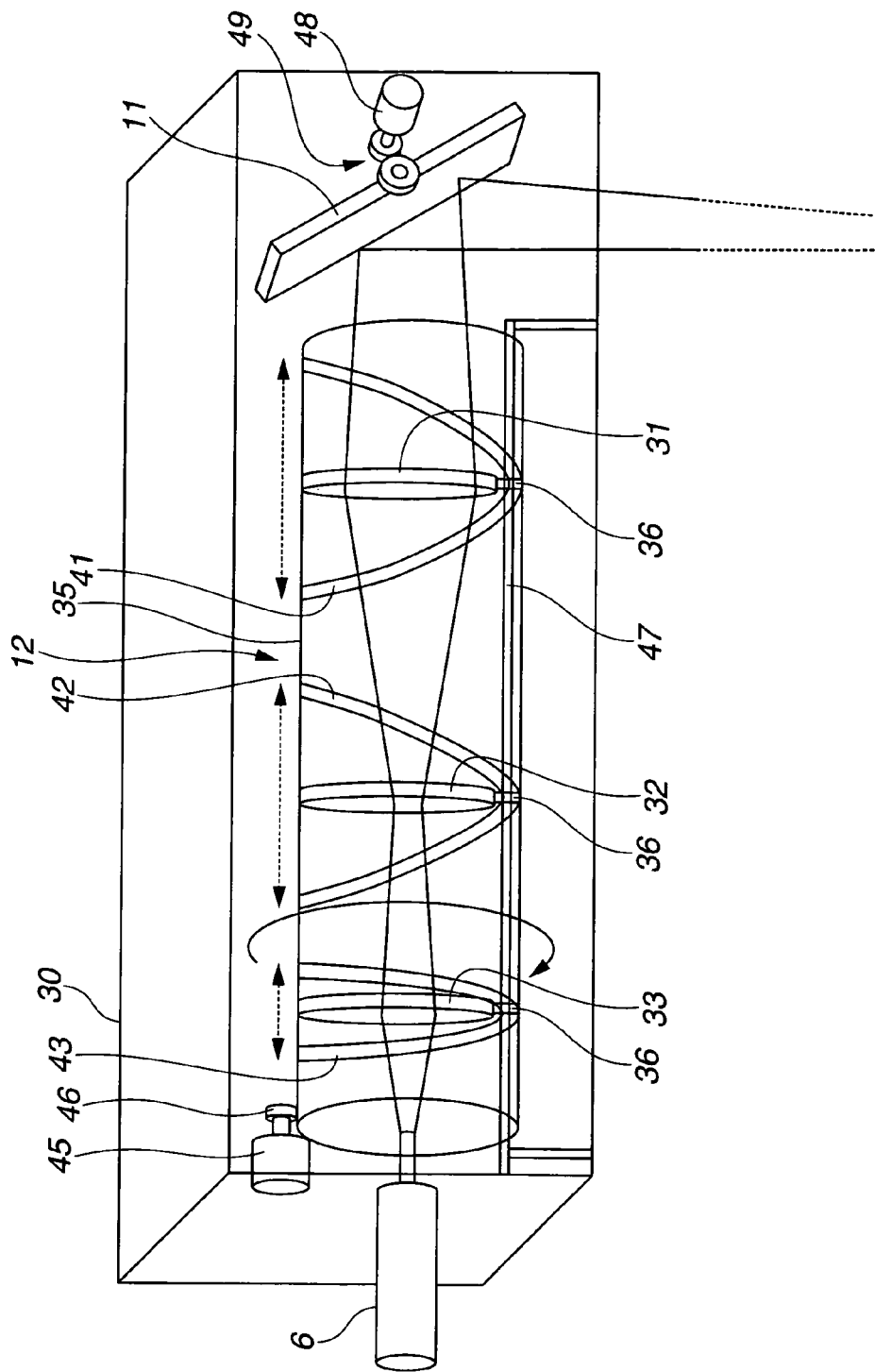
FIG. 1 is a schematic perspective view of a laser welding apparatus in accordance with a first embodiment.
Figure 2:
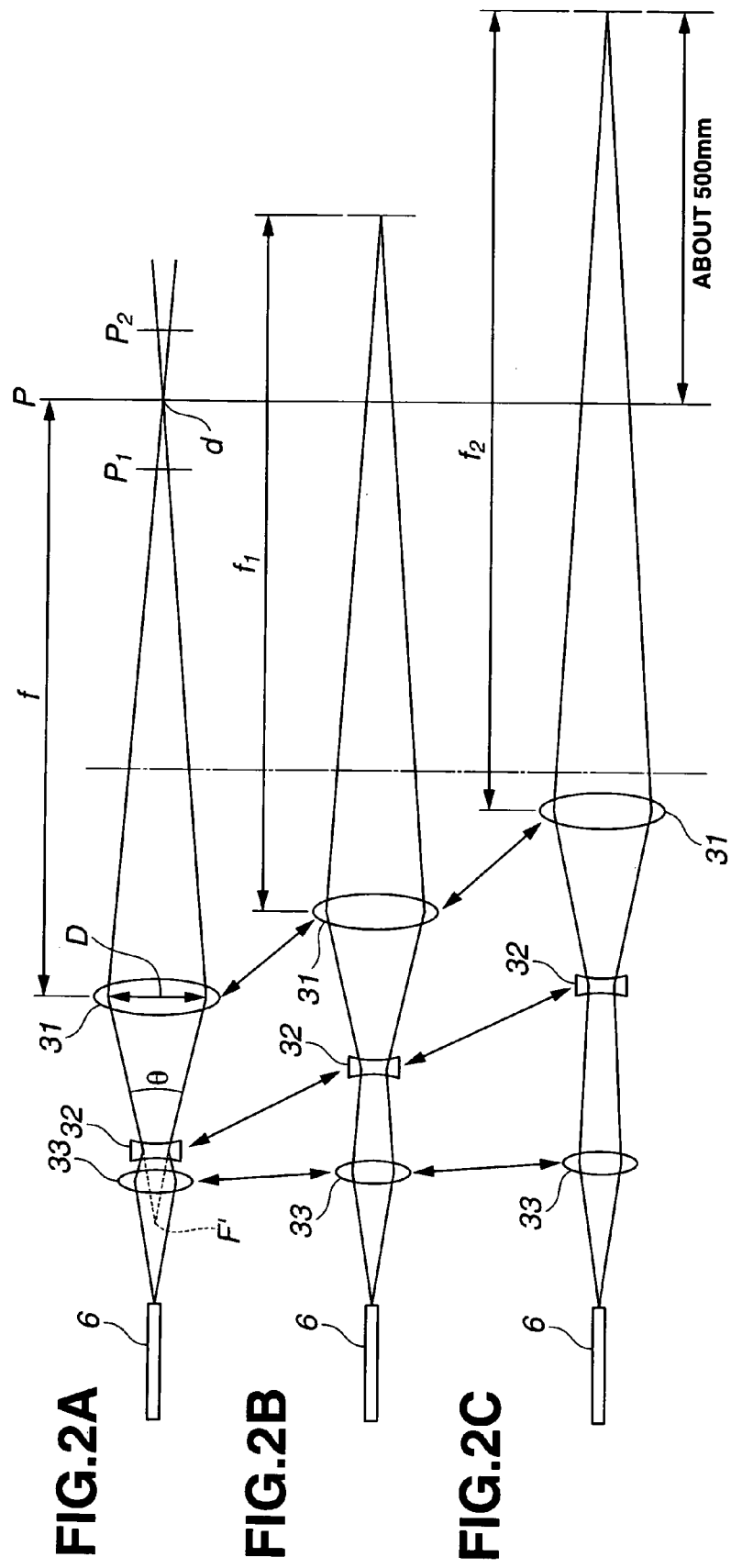
FIGS. 2A through 2C are views showing a principle of adjusting a focal point of a laser beam and the focal spot size of the laser beam in the laser welding apparatus of FIG. 1.

Referring now to FIGS. 1 through 2C, there is shown a laser welding apparatus in accordance with a first embodiment. FIG. 1 is a schematic perspective view of the laser welding apparatus of the first embodiment. As shown in FIG. 1, the laser welding apparatus of the first embodiment includes a laser machining head 3 as a laser welding unit. Laser machining head 3 includes a lens set 12, a reflector 11, and a housing 30 accommodating lens set 12 and reflector 11. Lens set 12 is an optical means for focusing a laser beam with an arbitrary focal length, and arbitrarily adjusting the spot size or spot diameter of a laser beam at focus. Reflector 11 is a laser distributing means for changing the direction of travel of the laser beam from lens set 12 arbitrarily in a predetermined region. Housing 30 is connected to a fiber-optic cable 6. Fiber-optic cable 6 is adapted to guide a laser beam from a laser oscillator to laser machining head 3, specifically to lens set 12.

Lens set 12 includes a first lens 31 adapted to focus the laser beam at a focal point, a second lens 32 adapted to diffuse the laser beam to first lens 31, and a third lens 33 adapted to guide the laser beam to second lens 32, preventing diffusion of the laser beam from fiber-optic cable 6. These lenses 31 to 33 are supported by a lens-barrel 35 serving as a lens position changing means for changing distances among lenses 31 to 33. Lens-barrel 35 includes spiral grooves 41-43 in its inner peripheral wall which are each engaged with a projection 36 formed in each of lenses 31 to 33. Lenses 31 to 33 are each arranged to travel in the longitudinal direction of lens-barrel 35 according to movement of grooves 41 to 43, respectively, along with rotation of lens-barrel 35. The shapes of grooves 41 to 43 are formed so that change in the distances among lenses 31 to 33 results in adjusting the focal length and the focal spot size of the laser beam. In this embodiment, grooves 41 to 43 are formed so that lenses 31 to 33 are longitudinally movable to change the laser focal length to change the position of the combined focal point over a longitudinal range of about 500 mm, and to hold the laser focal spot size as substantially constant.

Although the laser focal spot size may be not completely constant due to mechanical accuracy of the laser welding apparatus or optical accuracy of the lenses, it is preferable that variation in the laser focal spot size is less than 5% in consideration of desired accuracy of laser welding. As a result, although quality, thickness, number of sheets, required welding energy, etc., of welding materials, are to be taken in consideration, it is possible to continuously perform welding operation for a plurality of welding spots having different distances from the laser welding apparatus, without changing other welding conditions such as time period for laser irradiation. In this embodiment, variation in the laser focal spot size is designed to be less than 5% in case the focal point is changed within the range of about 500 mm.

In housing 30 is provided a motor 45 and a roller 46 for rotating lens-barrel 35 about its longitudinal axis. Motor 45 is adapted to rotate roller 46. Roller 46 is disposed in contact with the outer peripheral wall of lens-barrel 35, and is arranged to rotate lens-barrel 35 according to its rotation. The rotation of lens-barrel 35 changes the position of each of lenses 31 to 33, as mentioned above. A rotation stopper 47 is held stationary to housing 30, extending in the longitudinal axis of lens-barrel 35. Rotation stopper 47 is arranged to restrict rotation of lenses 31 to 33 about the longitudinal axis of lens-barrel 35, allowing the longitudinal movement of lenses 31 to 33.

The following describes a principle for adjusting the laser focal spot size arbitrarily even when the focal length changes according to change in distances among the three lenses. FIGS. 2A through 2C are views showing a principle of adjusting a focal point of a laser beam and the focal spot size of the laser beam in the laser welding apparatus of the first embodiment.

First lens 31 serves for focusing a laser beam at a focal point. Accordingly, first lens 31 is formed based on a convex lens. In such a convex lens, the focal length changes according to the diffusion angle of the incoming laser beam. The diffusion angle of the laser beam is represented by θ, and defined as an angle at which the laser beam spreads from a virtual focal point indicated by F' in FIG. 2A, diffused by second lens 32 as mentioned below. The focal length f of first lens 31 decreases with a decrease in diffusion angle θ, i.e. as the laser beam approaches a parallel beam. On the other hand, focal length f increases with an increase in diffusion angle θ, i.e. as the laser beam increasingly spreads to first lens 31. FIG. 12 is a view showing a general relationship between the refraction and the focal length in a convex lens. As shown in FIG. 12, the refractive index of a convex lens 31a is constant with respect to the diffusion angle of an incoming laser beam. In case of (diffusion angle θ1<diffusion angle θ2), the laser beam incoming with diffusion angle θ2 is focused at a farer point than with diffusion angle θ1. In FIG. 12, the focal point of the laser beam based on diffusion angle θ1 is indicated by G1, and the focal point of is the laser beam based on diffusion angle θ2 is indicated by G2.

In general, the focal point of a convex lens, which is a point where a beam of light is most narrowed after passing through the lens, has a certain size determined according to the diffraction limit of the lens. The laser focal spot size d is expressed by the following equation.

$$d = (4/\pi) \cdot (\lambda \cdot f / D) \quad (1)$$

where λ is the wavelength of a laser beam, and D is the width of the laser beam.

Apparently, laser focal spot size d changes with a change in focal length f, when beam width D of the laser beam incoming into first lens 31 is held constant. However, it is possible to arbitrarily change laser focal spot size d, by changing beam width D in addition to changing focal length f. That is, the laser focal spot size is changed by changing beam width D of the laser beam incoming to a convex lens.

In this embodiment, focal length f and laser focal spot size d are adjusted arbitrarily, independently of the focal length, by adjusting diffusion angle θ and beam width D of the laser beam incoming to first lens 31. In order to adjust diffusion angle θ and beam width D of the laser beam incoming to first lens 31, second lens 32 and third lens 33 are provided. Second lens 32 serves for diffusing the incoming laser beam, formed based on a concave lens accordingly. A concave lens diffuses the incoming laser beam. Beam width D of the laser beam entering first lens 31 is adjusted by changing the distance between second lens 32 and first lens 31. On the other hand, diffusion angle θ is changed by changing the position of virtual focal point F'. The position of virtual focal point F' is changed by adjusting the distance between third lens 33 and second lens 32. Third lens 33 guides the laser beam to second lens 32, preventing diffusion of the laser beam from fiber-optic cable 6. The focal point by third lens 33 is changed by changing the distance between third lens 33 and second lens 32, and by changing the position of third lens 33. This results in a change in the position of virtual focal point F'. Without third lens 33 in the above configuration, it is possible that when the laser beam is guided by fiber-optic cable 6 and is emitted from the tip of fiber-optic cable 6 as a diffusion beam directly to second lens 32, the degree of diffusion of the laser beam is too high. In addition, it may be impossible to change the position of virtual focal point F' of the laser beam entering second lens 32, without third lens 33.

The following describes the movement of the lenses in detail, referring to FIGS. 2A through 2C. Here, the position of a laser focal point is changed over a range of about 500 mm by changing the laser focal length. FIG. 2A shows a situation where focal length f is a shortest setting. FIG. 2B shows a situation where focal length f is f1 longer than in FIG. 2A and focal laser spot size d is the same as in FIG. 2A. In the situation of FIG. 2B, diffusion angle θ of the laser beam entering first lens 31 is increased to increase the laser focal length, with respect to the situation of FIG. 2A. On the other hand, beam width D of the laser beam entering first lens 31 is increased to cancel is the expansion of the laser focal spot size d according to the increase in the focal length as shown in the above-mentioned equation (1), so that laser focal spot size d is the same as in FIG. 2A. Accordingly, the interval of first lens 31 and second lens 32, and the interval of second lens 32 and third lens 33, are both increased, while interval of third lens 33 and the laser exit point of fiber-optic cable 6 is increased, with respect to the situation of FIG. 2A. FIG. 2C shows a situation where focal length f is further increased to be f2 and focal laser spot size d is the same as in FIG. 2A. In the situation of FIG. 2C, diffusion angle θ of the laser beam entering first lens 31 is increased to increase the laser focal length, with respect to the situation of FIG. 2B. On the other hand, beam width D of the laser beam entering first lens 31 is increased to cancel the expansion of the laser focal spot size d according to the increase in the focal length, so that the laser focal spot size d is the same as in FIGS. 2A and 2B. Accordingly, the interval of first lens 31 and second lens 32, and the interval of second lens 32 and third lens 33, are both increased further, while the interval of third lens 33 and the laser exit point of fiber-optic cable 6 is increased further. As shown in FIG. 2A, the spot size of the laser beam is the smallest at a combined focal point P, while the spot size of the laser beam is larger at points $P_1$ and $P_2$ apart from focus than focal laser spot size d. Accordingly, the energy of the laser beam is most concentrated into the smallest area at focal point P.

As discussed above, the laser welding apparatus of this embodiment is effective for arbitrarily controlling the laser focal spot size even when the focal length changes. Specifically, the laser welding apparatus wherein the laser focal spot size is held constant is effective for enhancing the efficiency of laser energy, and for performing laser welding without adjusting the welding time for each welding spot.

In the above first embodiment, lens set 12 serves as a laser focusing section arranged to focus a laser beam. Lens-barrel 35, protrusion 36, grooves 41-43, motor 45, roller 46, and rotation stopper 47 serve as a focus adjusting section arranged to adjust a focal length of the laser beam to focus the laser beam at a desired focal point, and arranged to adjust a laser focal spot size of the laser beam as desired. Specifically, the focus adjusting section is arranged to adjust a relative position of each of the first lens, the second lens, and the third lens, to adjust a diffusion angle and a beam width of the laser beam entering the first lens. Reflector 11 serves as a laser distributing section arranged to adjust a relative direction of travel of the laser beam exiting the laser focusing section (the first lens).

Figure 3:
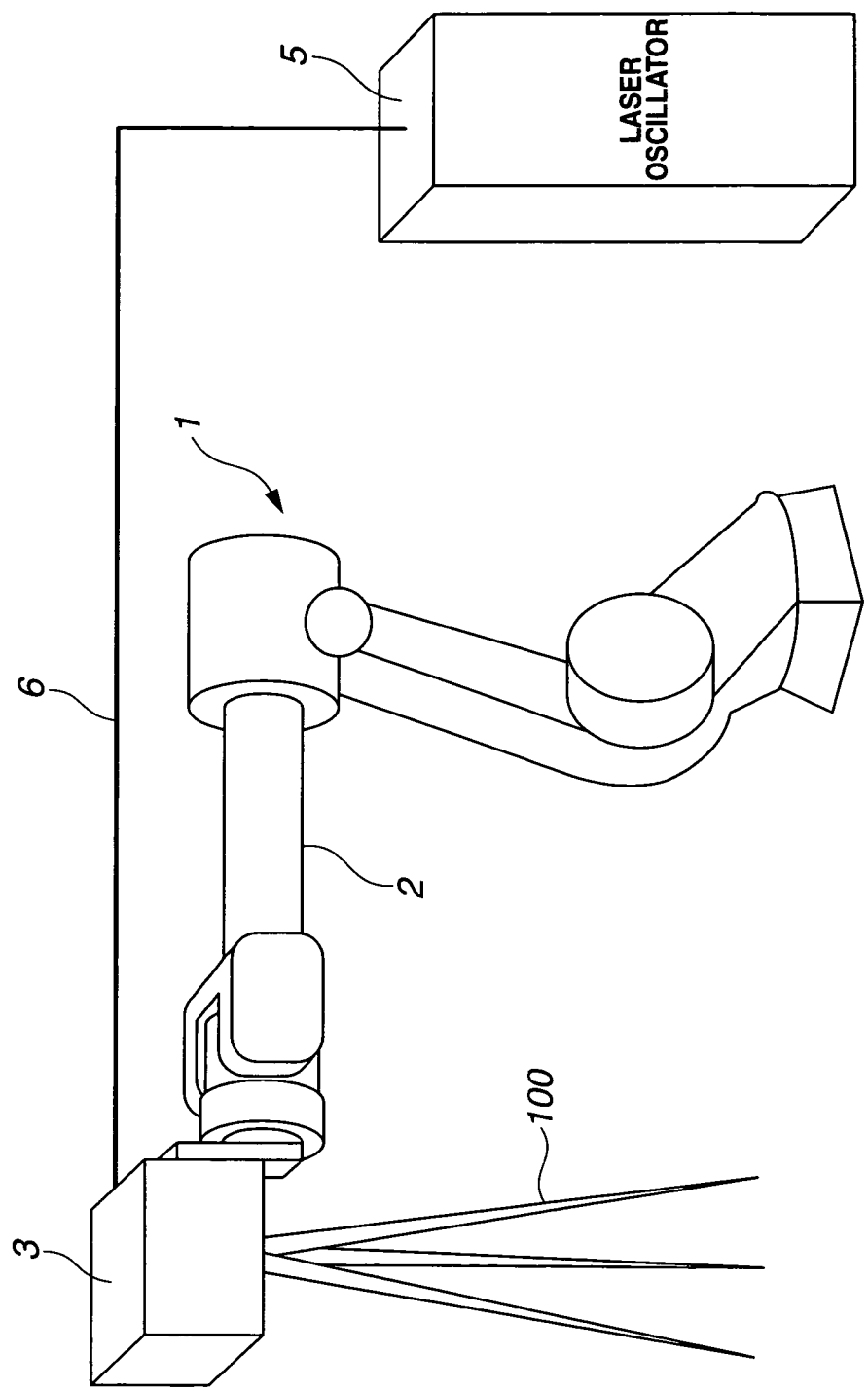
FIG. 3 is a schematic perspective view of a laser welding apparatus in accordance with a second embodiment.
Figure 4:
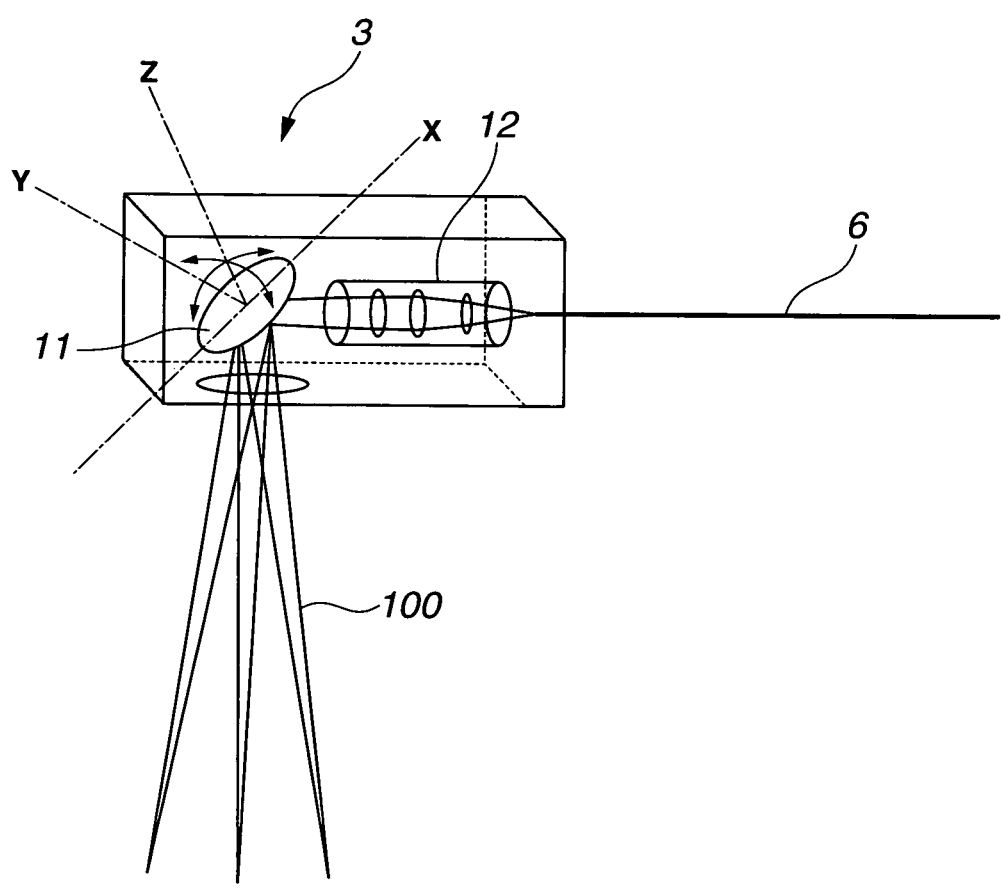
FIG. 4 is a schematic perspective view of a laser machining head of the laser welding apparatus of FIG. 3.

Referring now to FIGS. 3 through 10, there is shown a laser welding apparatus in accordance with a second embodiment. The laser welding apparatus of the second embodiment includes laser machining head 3 of the laser welding apparatus of the first embodiment. FIG. 3 is a schematic perspective view of the laser welding apparatus of the second embodiment. FIG. 4 is a schematic perspective view of the laser machining head of the laser welding apparatus of FIG. 3. In contrast to old techniques of spot welding, this laser welding apparatus performs welding using a laser beam from a place distant from a work, without direct contact with the work. Accordingly, such a laser welding is referred to as remote welding. As shown in FIG. 3, the laser welding apparatus of this embodiment includes a robot 1, laser machining head 3 mounted on the tip of a robotic arm 2 of robot 1 and adapted to emit a laser beam 100, a laser oscillator 5 as a source of laser beam, and fiber-optic cable 6 arranged to guide a laser beam from laser oscillator 5 to laser machining head 3.

Robot 1 is a common multi-axis robot called articulated robot, being configured to change its posture according to the data of the course of motion given by teaching operation, to move the tip of robotic arm 2, or to serve as an actuator to move laser machining head 3.

As shown in FIG. 4, and as in the first embodiment, laser machining head 3 includes reflector 11 for finally directing laser beam 100 at each object, and lens set 12 for changing the position of focal point of laser beam 100. Reflector 11 is supported in laser machining head 3, to freely rotate independently in each of an X-axis and a Y-axis, to change the direction of emitting laser beam 100, where the X-axis and the Y-axis are both normal to a Z-axis perpendicular to its specular surface. In order to rotate reflector 11, laser machining head 3 includes a motor 48 and a gear mechanism 49 for rotating reflector 11 independently in each of the X-axis and the Y-axis, as shown in a simplified form in FIG. 1. Motor 48 for reflector 11 is controlled by a machining head controller as is mentioned below. Motor 45 for lens set 12 is also controlled by the machining head controller.

Laser oscillator 5 is formed as a YAG laser oscillator, in order to guide a laser beam with fiber-optic cable 6.

Figure 5:
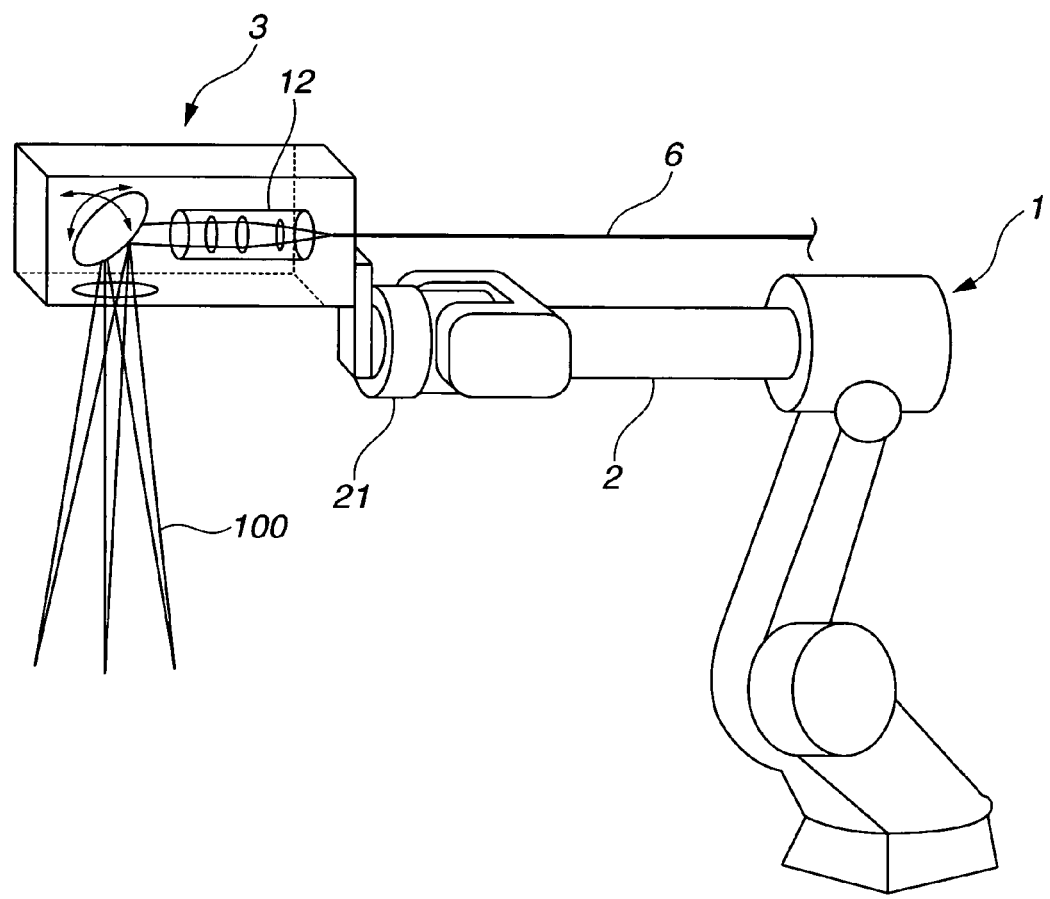
FIG. 5 is a view showing an example of attachment of the laser machining head to a robot in the laser welding apparatus of FIG. 3.
Figure 6:
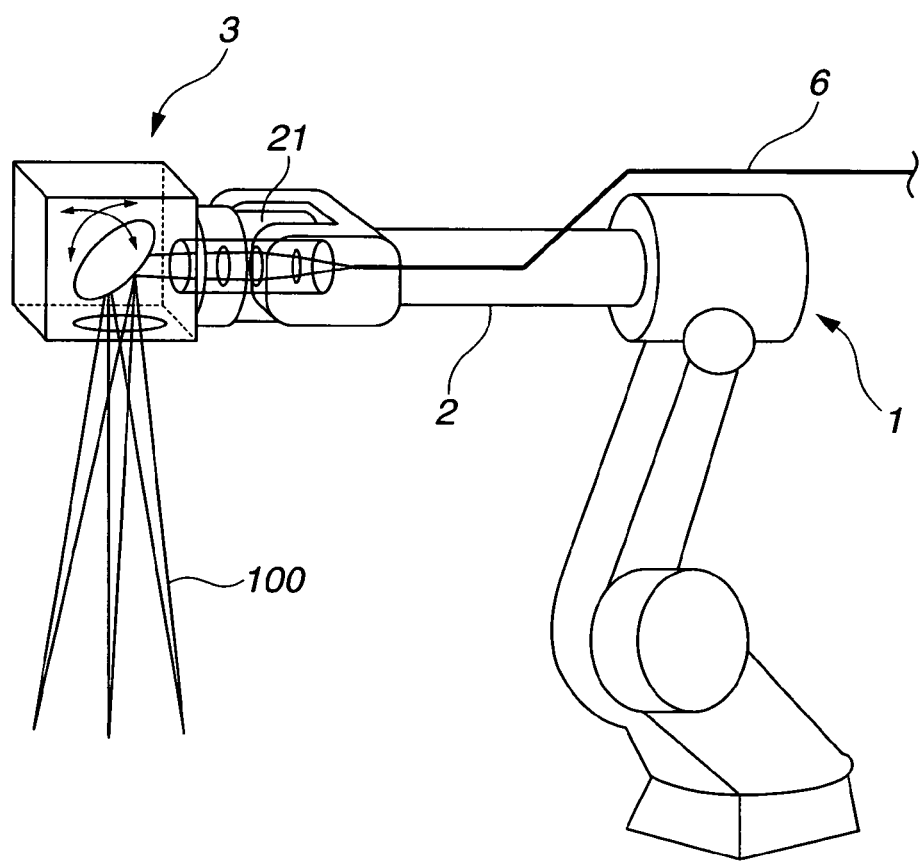
FIG. 6 is a view of another example of attachment of the laser machining head to the robot in the laser welding apparatus of FIG. 3.

FIGS. 5 and 6 are views of examples of attachment of laser machining head 3 to robot 1. In the example as shown in FIG. 5, laser machining head 3 is attached to a wrist part 21 at the tip of robotic arm 2 with an offset from the central longitudinal axis of robotic arm 2. Fiber-optic cable 6 is attached directly to laser machining head 3, extending outside of robotic arm 2. In the example as shown in FIG. 6, a part of laser machining head 3 is embedded in wrist part 21. Fiber-optic cable 6 is arranged to extend within robotic arm 2. In this example, laser machining head 3 is formed compact, to be used in complicated and narrow spaces. As a result, the laser welding apparatus is applicable to many welding spots. In addition, the arm section of robot 1 is also formed compact, since fiber-optic cable 6 is housed in robotic arm 2. This compactness serves for using laser welding for many welding spots, for example, in welding processes for automobile body, and reducing the number of hand welding processes for narrow places etc., resulting in improvement in productivity. However, attachment of laser machining head 3 may be implemented in any other way suitably selected based on the shape and type of robot 1 and the shape of laser machining head 3, etc.

Figure 7:
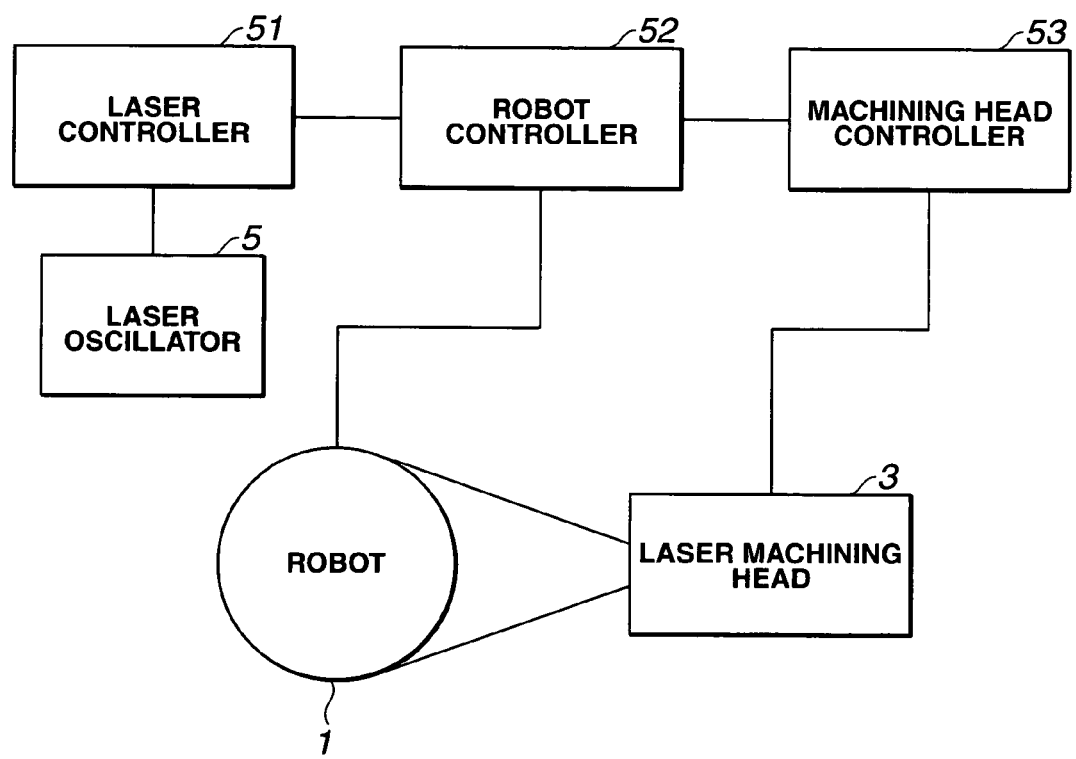
FIG. 7 is a block diagram showing a control system of the laser welding apparatus of FIG. 3.

FIG. 7 is a block diagram showing a control system of the laser welding apparatus of the second embodiment. The laser welding apparatus includes an electrical control unit, i.e. a laser controller 51 for controlling an ON/OFF state of laser oscillator 5, a robot controller 52 for controlling motion of robot 1, and a machining head controller 53 for controlling reflector 11, and motor 45 for actuating lens set 12 or for rotating lens-barrel 35. Controllers 51, 52, and 53 each include an input/output interface (I/O), memories (RAM, ROM), and a microprocessor or a central processing unit (CPU). Laser controller 51 is configured to receive a control signal from robot controller 52, and to control the ON/OFF state of laser oscillator 5, and adjust the intensity of laser beam, in accordance with the control signal. Robot controller 52 is configured to control motion of robot 1, and additionally configured as a main control unit to output a control signal to laser controller 51 to control the ON/OFF state of laser oscillator 5, and to output a control signal to machining head controller 53 to control operation of reflector 11 and lens set 12. Robot controller 52 has a teach mode, where the instruction data concerning the operations of robot 1, reflector 11, and lens set 12 is set and stored in robot controller 52. In accordance with the taught data or instruction data, robot controller 52 controls the operation of robot 1 and outputs various control signals. Machining head controller 53 is configured to receive a control signal from robot controller 52, and to control the motions of reflector 11 and lens set 12 in laser machining head 3 in accordance with the control signal.

Figure 8:
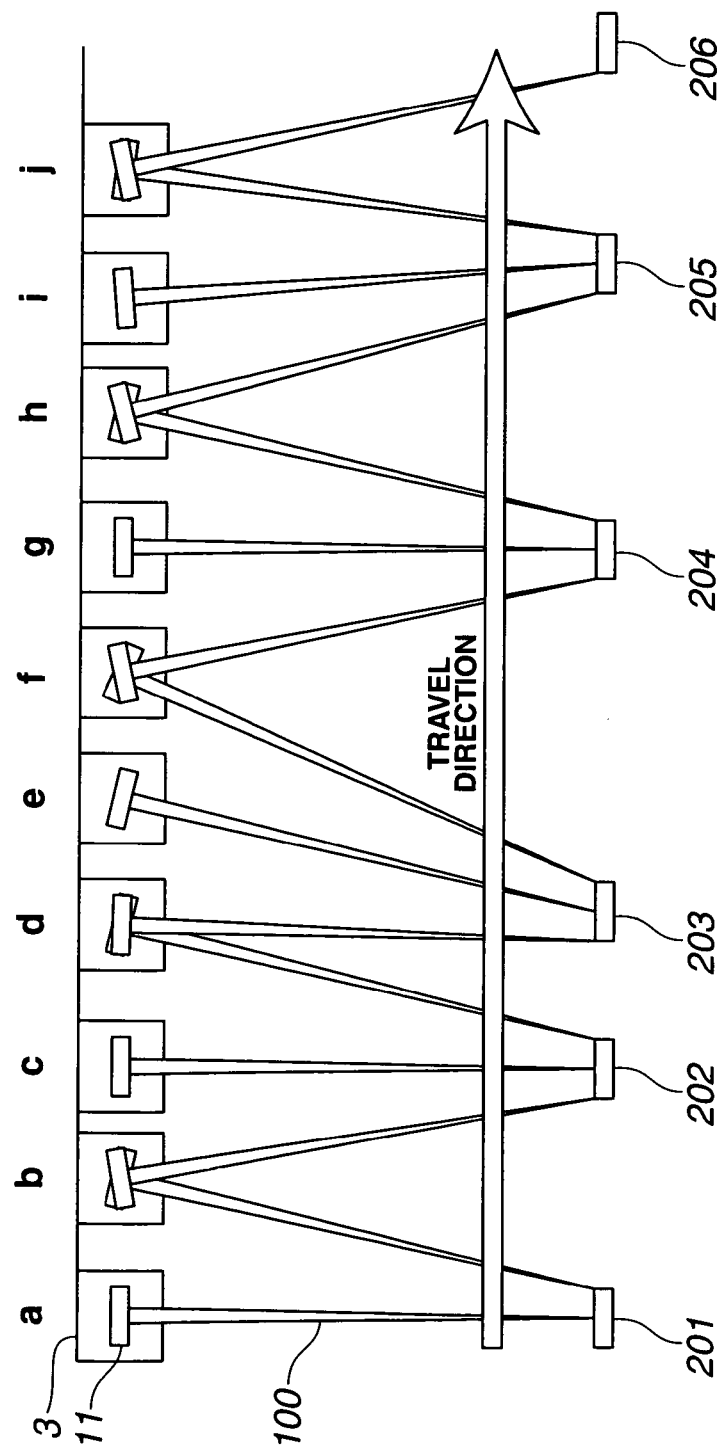
FIG. 8 is a view showing travel of the laser machining head and change in the direction of travel of the laser beam in the laser welding apparatus of FIG. 3.

The following describes a laser welding method using the laser welding apparatus in accordance with the second embodiment. FIG. 8 is a view showing movement of the laser machining head and change in the direction of the laser beam. In a simple case as shown in FIG. 8, there are a plurality of welding spots 201 to 206. During emitting laser beam 100 to one welding spot (for example, 201), laser machining head 3 is controlled to continue to move at a predetermined constant speed toward the next welding spot (for example, 202). The travel trajectory of laser machining head 3 is predetermined to extend along from one welding spot to the next welding spot. In parallel, reflector 11 is controlled to rotate in such a manner to direct laser beam 100 at the present welding spot (201) until welding operation for the present welding spot is completed, to cancel the effect of travel of laser machining head 3.

The movement of laser machining head 3 is performed by changing the posture of robot 1, i.e. by moving robotic arm 2. The motion of robot 1 is controlled by robot controller 52, so that laser machining head 3 moves from one welding spot to the next welding spot at a fixed speed. In FIG. 8, laser machining head 3 moves at a fixed speed from the position of a to the position of i. Moving laser machining head 3 at a fixed speed serves for reducing vibration of robotic arm 2 due to movement of robotic arm 2, to keep the focal point of laser beam 100 within a target position (welding spot). The travel speed of laser machining head 3 is fixed from the start to the end of overall welding operation, since there is only a short interval period (non-welding time) for changing the direction of laser beam 100 from one welding spot to the next welding spot as mentioned below in detail. In case a non-welding time is long, the travel speed of laser machining head 3 may be temporarily set higher during the non-welding time.

In parallel to the above operation of laser machining head 3, during welding one welding spot, reflector 11 is controlled to rotate so that the laser focal point moves relatively in the direction opposite to the direction of travel of laser machining head 3, and so that the relative travel speed of the laser focal point is substantially identical to the travel speed of laser machining head 3. The rotational speed of reflector 11 at this time is referred to as for-welding speed setting. According to the above operation of reflector 11, the laser focal point moves relative to laser machining head 3 to cancel the travel of laser machining head 3, and thereby to keep directing the laser beam at one welding spot during welding operation for the welding spot. In case a welding spot has some length of bead (bead size) to be weld, it is necessary to slightly move the laser irradiation point (focal point) over the bead of the welding spot. Specifically, the relative travel speed of the laser focal point due to rotation of reflector 11 is adjusted according to the bead length along the travel of laser machining head 3, to be slower slightly than the travel speed of laser machining head 3.

The travel speed of laser machining head 3 is set higher than welding speed, so that when welding operation for one welding spot (for example, 201) is completed, laser machining head 3 is in a position suitable for the following welding spot (for example, 202). Usually, the welding speed of laser welding is 1 to 5 m/min. On the other hand, the maximum travel speed of laser machining head 3 or the maximum travel speed of robotic arm 2 varies among robots, for example, taking a value of about 10 to 20 m/min, while the maximum travel speed of the laser focal point by reflector 11 is about 100 m/min in a position about Am from reflector 11. In this embodiment, the travel speed of laser machining head 3 is set higher than the welding speed. It is preferable to select an actual setting of the travel speeds for welding operation in consideration of the above capacities of speed so that the travel speed of laser machining head 3 is as low as possible, in order to reduce vibration of laser machining head 3. The movement of the laser focal point from one welding spot (for example, 201) to the following welding spot (for example, 202) is mainly contributed to by rotation of reflector 11. This rotation of reflector 11 is completed as quickly as possible. During the shift between welding spots, the laser output from laser oscillator 5 may be controlled to keep active without turning off. At this time, it is possible that the laser beam is brought to places except the welding spots. However, the travel speed of the laser focal point is much higher than the welding speed as mentioned above. Accordingly, the places unintentionally irradiated are out of focal points or are passed by laser beam 100 for little time, so that the places irradiated are under little influence of laser or little damaged. However, as circumstances demand, alternatively, robot controller 52 may send an OFF signal to laser controller 51, to suspend the laser output of laser oscillator 5.

In the above operation, at the start of welding operation for a welding spot (for example, 202), laser machining head 3 at the tip of robotic arm 2 is in a position (for example, position b) behind the welding spot in the travel direction of laser machining head 3, while at the end of welding operation for the welding spot, laser machining head 3 is in a position (for example, position d) ahead of the welding spot. In other words, laser machining head 3 is controlled to travel to be in a backward position with respect to an initial welding spot along the travel trajectory of laser machining head 3 at a start of welding for the initial welding spot, and to be in a forward position with respect to a final welding spot along the travel trajectory of the laser welding unit at an end of welding for the final welding spot.

While welding one welding spot, laser machining head 3 is controlled to move, to change the relative distance between laser machining head 3 and the welding spot. Accordingly, the laser focal length is adjusted according to the movement of laser machining head 3. Actually, machining head controller 53 controls lens-barrel 35 to rotate to move lens set 12 to adjust the focal length of laser beam 100, based on the instruction data provided in robot controller 52. As mentioned above, lens-barrel 35 includes the grooves to guide the movement of lenses, and serves for holding the laser focal spot size substantially constant independently of the laser focal length. Accordingly, robot controller 52 is input with instruction data for changing the laser focal length in accordance with a change in the relationship between the position of laser machining head 3 and the position of a welding spot, to automatically control the laser spot size to be substantially constant in all the laser focal points. Accordingly, each welding spot is irradiated with the laser beam at a focal point with the minimum spot size that energy efficiency is the highest, independently of the relative distance to laser machining head 3. Further, it is unnecessary to adjust the period of laser irradiation per unit area of each welding spot.

Figure 9:
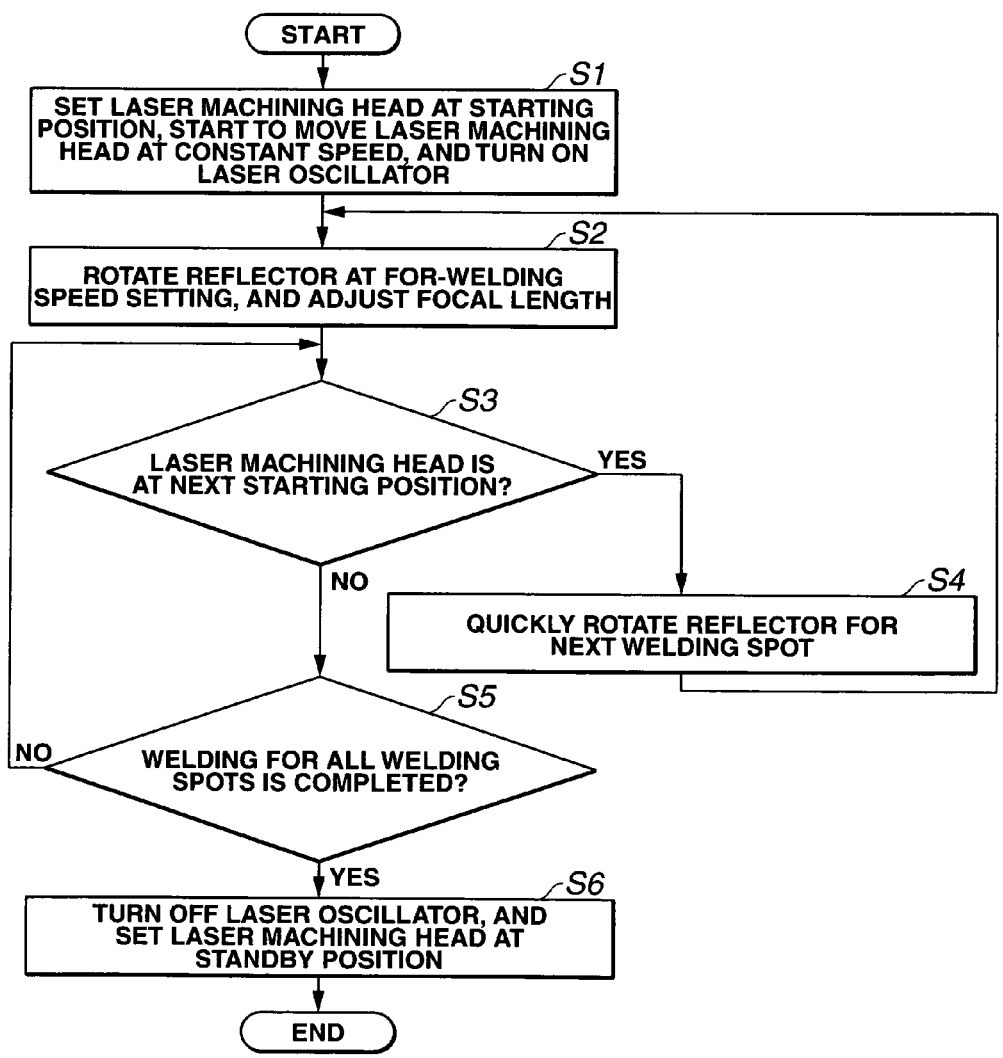
FIG. 9 is a flow chart showing a procedure of laser welding control to be performed by the laser welding apparatus of FIG. 3.

The following describes operations of the laser welding apparatus of the second embodiment. FIG. 9 is a flow chart showing a procedure of laser welding control to be performed by the laser welding apparatus. As shown in FIG. 9, first, at step Si, robot controller 52 controls laser machining head 3 to travel to a starting position for a first welding spot, and to start to travel at a fixed speed, according to the instruction data prepared beforehand, and issues a control command to laser controller 51 to turn on the laser output of laser oscillator 5. Subsequently, at step S2, robot controller 52 issues a control command to machining head controller 53 to control reflector 11 to rotate at the for-welding speed setting and to control lens set 12 to adjust the focal length of laser beam 100. Subsequently, at step S3, robot controller 52 determines whether or not laser machining head 3 has arrived at the starting position for the next welding spot according to the instruction data. The instruction data is set so that the welding starting position for the next welding spot is identical to the end position for the previous welding spot. When the answer to step S3 is affirmative (YES), the routine proceeds to step S4. On the other hand, when the answer to step S3 is negative (NO), the routine proceeds to step S5. At step S4, robot controller 52 issues a control command to machining head controller 53 to control reflector 11 to rotate at a high speed to direct laser beam 100 at the next welding spot. This operation is repeatedly performed at each shift between welding spots until the end of welding operation for the last welding spot. At step S5, robot controller 52 determines whether or not welding operation for all the welding spots is completed, based on the instruction data. When the answer to step S5 is YES, the routine proceeds to step S6. On the other hand, when the answer to step S5 is NO, the routine returns to step S3. As a result, the welding operation for the present welding spot is continued. At step S6, robot controller 52 issues a control command to laser controller 51 to turn off the laser output of laser oscillator 5, according to the instruction data, and controls laser machining head 3 to move to a standby position or operation end position. Subsequently, the routine ends.

As described using the example of FIG. 8, first, robot controller 52 controls laser machining head 3 to move to a starting position a for the first welding spot 201 and to start to move at a fixed speed, and issues a control command to laser controller 51 to turn on the laser output of laser oscillator 5. In parallel, robot controller 52 issues a control command to machining head controller 53 to control reflector 11 to rotate at the for-welding speed setting to direct laser beam 100 at the next welding spot is 201. When laser machining head 3 passes point a and arrives at a starting position b for welding spot 202, or when welding operation for welding spot 201 is completed, robot controller 52 controls reflector 11 to rotate at the maximum speed based on the instruction data, to direct laser beam 100 at welding spot 202. Then, welding operation for welding spot 202 is performed. When these processings are repeated to complete welding operation for welding spot 206, the laser output of laser oscillator 5 is stopped and the whole welding operation is terminated.

In summary, the laser welding apparatus performs actuating the laser welding unit to travel at a predetermined speed along a predetermined trajectory; directing the laser beam at a first welding spot; adjusting the focal length to focus the laser beam at the first welding spot; holding the laser focal spot size substantially constant; and directing the laser beam at a second welding spot after completion of welding for the first welding spot.

Figure 11A:
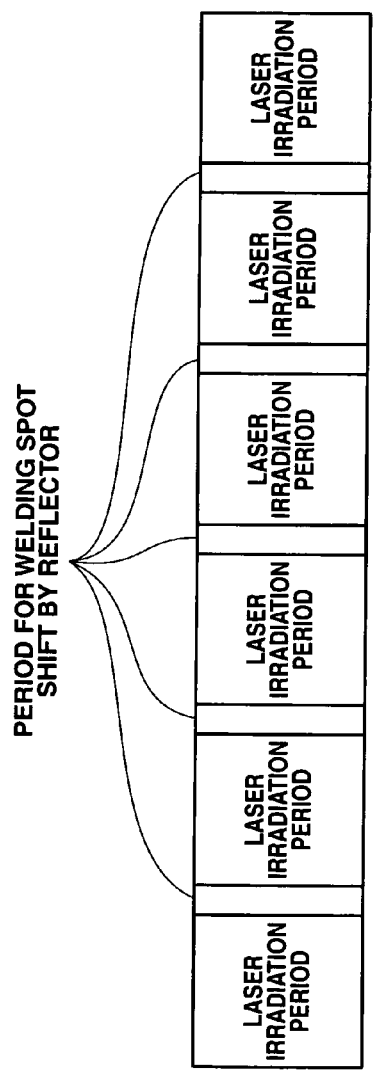
FIGS. 11A and 11B are views showing a comparison in overall period of time of welding operation between the second embodiment and the reference example.
Figure 11B:
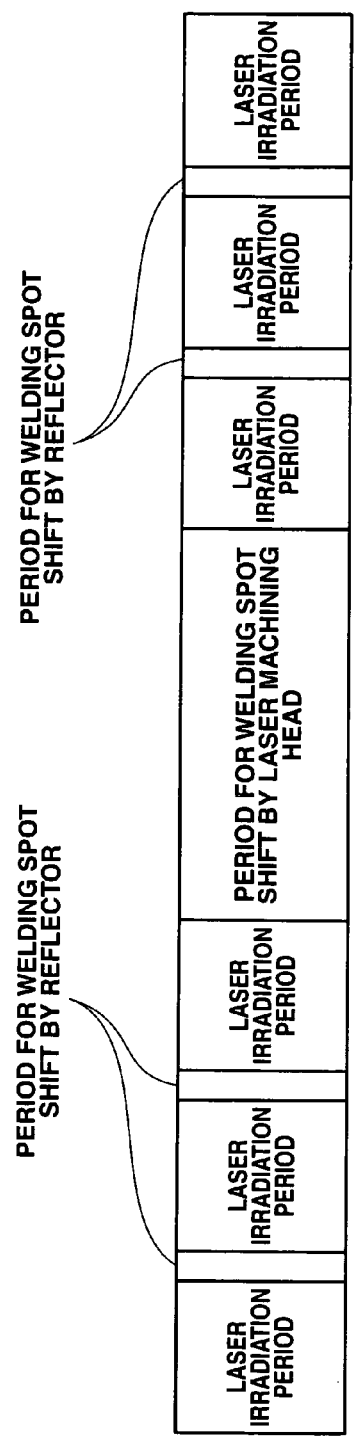

The following describes a comparison between the embodiment and a reference example. FIG. 10 is a view showing an operation of laser welding by a reference laser welding technique. In the reference example as shown in FIG. 10, first, laser machining head 103 is controlled to move until laser machining head 103 reaches a position A in FIG. 10. Held stationary, laser machining head 103 performs welding operation by rotating reflector 111 in each direction to welding spots 301, 302, and 303 that are within a region where reflector 111 is able to distribute a laser beam 150. The laser irradiation time period is adjusted separately for each of welding spots 301, is 302, and 303, to cancel variations in the laser spot size among welding spots 301, 302, and 303 due to variations in distance to laser machining head 103 among welding spots 301, 302, and 303. If the laser spot size is adjusted to be constant according to the conventional method shown in Published Japanese Patent Application No. 2004-050246, it may be impossible to use the laser focal point for welding, resulting in adversely affecting the utilization efficiency of the laser energy, to increase the laser irradiation time period per welding spot. After the end of welding operation for welding spot 303, the laser output is temporarily turned off. Then, laser machining head 103 is controlled to move until laser machining head 103 reaches a position B in FIG. 10. Held stationary, laser machining head 103 performs welding operation by rotating reflector 111 in each direction to welding spots 304, 305, and 306. The laser irradiation time period is adjusted separately for each of the welding spots, similarly as at position A FIGS. 11A and 11B are views showing a comparison in overall period of time of welding operation between the second embodiment and the reference example. FIG. 11A shows a case of this embodiment, while FIG. 11B shows a case of the reference example. In FIGS. 11A and 11B, the horizontal length of each box is indicative of a relative length of time period. As shown in FIGS. 11A and 11B, the laser welding method of this embodiment does not need a period of time that laser machining head 3 stops laser welding operation and moves to the following position, as in the reference example. This results in reduction in the period for the whole welding operation. In addition, the laser irradiation time period in each welding spot is reduced, so that the period for the whole welding operation is further reduced, since the laser focal spot size is used to enhance the energy efficiency for each welding spot. The above advantage increases with an increase in the number of welding spots. For example, in a typical automobile body assembly line, the number of welding spots is of the order of hundreds. Accordingly, when the laser welding apparatus and method of this embodiment is applied to part or all of an automobile body assembly line, it produces a large amount of reduction in the period for the whole welding operation.

The following describes advantages and effects produced by the laser welding apparatus and method of this embodiment. The laser welding apparatus that the travel speed of laser machining head 3 is set higher than the welding speed, is effective for placing laser machining head 3 in such a position that the next welding spot is within a region that reflector 11 is able to rotate to direct the laser beam, and thereby for reducing non-welding time in continuous welding operation for a plurality of welding spots. The laser welding apparatus that at the start of welding operation for a welding spot, laser machining head 3 is in a position behind the welding spot in the movement direction of laser machining head 3, while at the end of welding operation for the welding spot, laser machining head 3 is in a position ahead of the welding spot, is effective for ensuring to place laser machining head 3 in such a position that the next welding spot is within a region that reflector 11 is able to rotate to direct the laser beam.

The reduction in non-welding time results in an increase in the recovery efficiency of the cost of a laser welding system, especially a high cost of a laser oscillator.

In a system including a plurality of laser machining heads and a laser oscillator for supplying laser beams to the laser machining heads, which is basically constructed based on the laser welding device of the reference example, it is possible that the laser beam for one laser machining head needs to be absorbed by a member formed of laser absorption material during non-welding time of the laser machining head. On the other hand, in this embodiment, such a laser absorption member is unnecessary, since there is little non-welding time in the laser welding method of this embodiment. This prevents a loss in electric energy due to absorption of laser.

The laser welding apparatus and method of the embodiment may be modified as follows. Although the laser focal spot size and the focal length is controlled with lens set 12 including three lenses in the above-mentioned embodiment, lens set 12 may be constructed in consideration of lens aberration etc., in various forms, such a form that lens set 12 includes additional lenses in the path of laser beam, or such a form that lenses 31 to 33 of lens set 12 are each formed as a compound lens. In addition, although the distances among lenses 31 to 33 are extended to extend the focal length as shown in FIGS. 2A through 2C in the shown embodiment, setting of distances between lenses may be properly changed in accordance with the characteristics of lenses used.

Although the laser focal spot size is held substantially constant independently of the focal length in the above-mentioned embodiment, the laser welding apparatus may be configured so that the laser focal spot size is suitably controlled independently of the focal length.

Although a plurality of welding spots are linearly located in a line as shown in FIG. 8 in the above-mentioned embodiment, the laser welding apparatus and method of the embodiment is applicable to any other curved courses of operation.

This application is based on a prior Japanese Patent Application No. 2005-32094 filed on Feb. 8, 2005. The entire contents of this Japanese Patent Application No. 2005-32094 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A laser welding apparatus comprising a laser welding unit, the laser welding unit comprising:
    a laser focusing section arranged to focus a laser beam, the laser focusing section comprising:
        a first lens adapted to focus the laser beam at a focal point,
        a second lens adapted to diffuse the laser beam to the first lens, and
        a third lens adapted to guide the laser beam to the second lens;
    a focus adjusting section comprising a lens-barrel, the lens-barrel being rotatable supported in the laser welding unit such that the lens-barrel is rotatable about a longitudinal axis of the lens-barrel, the lens-barrel including three spiral grooves in an inner peripheral wall of the lens-barrel; and
    at least one stopping device arranged to restrict rotation of the first lens, the second lens, and the third lens when the lens-barrel is rotated,
    wherein the first lens, the second lens, and the third lens are engaged with respective ones of the spiral grooves such that the first lens, the second lens, and the third lens move in a direction of the longitudinal axis of the lens-barrel when the lens-barrel is rotated, and
    wherein the focus adjusting section is arranged to adjust at least one of a focal length of the laser beam, and a focal spot size of the laser beam.

2. The laser welding apparatus as claimed in claim 1, wherein the laser welding unit further comprises a fiber-optic cable arranged to guide the laser beam to the third lens.

3. The laser welding apparatus as claimed in claim 1, wherein the focus adjusting section is arranged to adjust the relative position of each of the first lens, the second lens, and the third lens, to hold the laser focal spot size constant with respect to change in the focal length.

4. The laser welding apparatus as claimed in claim 1, wherein the laser welding unit further comprises a reflector arranged to adjust a relative direction of travel of the laser beam exiting the first lens.

5. The laser welding apparatus as claimed in claim 1, wherein the laser welding unit further comprises a laser distributing section arranged to adjust a relative direction of travel of the laser beam exiting the laser focusing section.

6. The laser welding apparatus as claimed in claim 5, further comprising:
    an actuator arranged to actuate the laser welding unit to travel; and
    a control unit connected for signal communication to the laser welding unit and the actuator, and programmed to perform the following:
        actuating the laser welding unit to travel at a predetermined speed along a predetermined trajectory;
        directing the laser beam at a first welding spot;
        adjusting the focal length to focus the laser beam at the first welding spot;
        holding the laser focal spot size constant; and
        directing the laser beam at a second welding spot after completion of welding for the first welding spot.

7. The laser welding apparatus as claimed in claim 6, wherein the predetermined speed of the laser welding unit is predetermined to be constant during welding for each welding spot.

8. The laser welding apparatus as claimed in claim 7, wherein the predetermined speed of the laser welding unit is predetermined to be constant during overall operation of welding.

9. The laser welding apparatus as claimed in claim 7, wherein the predetermined speed of the laser welding unit is predetermined to be higher than a welding speed for each welding spot.

10. The laser welding apparatus as claimed in claim 7, wherein the travel trajectory of the laser welding unit is predetermined to extend along from the first welding spot to the second welding spot.

11. The laser welding apparatus as claimed in claim 7, wherein the control unit is arranged to control the laser welding unit to travel to be in a backward position with respect to an initial welding spot along the travel trajectory of the laser welding unit at a start of welding for the initial welding spot, and to be in a forward position with respect to a final welding spot along the travel trajectory of the laser welding unit at an end of welding for the final welding spot.

12. The laser welding apparatus as claimed in claim 1,
    wherein the focus adjusting section further comprises a motor arranged to rotate the lens-barrel.

13. A method of controlling a laser welding apparatus, the method comprising:
    providing a laser welding apparatus comprising a laser welding unit, the laser welding unit comprising:
        a laser focusing section arranged to focus a laser beam, the laser focusing section comprising:
            a first lens adapted to focus the laser beam at a focal point,
            a second lens adapted to diffuse the laser beam to the first lens, and
            a third lens adapted to guide the laser beam to the second lens;
        a focus adjusting section comprising a lens-barrel, the lens-barrel being rotatable supported in the laser welding unit such that the lens-barrel is rotatable about a longitudinal axis of the lens-barrel, the lens-barrel including three spiral grooves in an inner peripheral wall of the lens-barrel; and at least one stopping device arranged to restrict rotation of the first lens, the second lens, and the third lens when the lens-barrel is rotated, wherein the first lens, the second lens, and the third lens are engaged with respective ones of the spiral grooves such that the first lens, the second lens, and the third lens move in a direction of the longitudinal axis of the lens-barrel when the lens-barrel is rotated, and wherein the focus adjusting section is arranged to adjust at least one of a focal length of the laser beam, and a focal spot size of the laser beam;

actuating the laser welding unit to travel at a predetermined speed along a predetermined trajectory;

directing the laser beam at a first welding spot;

adjusting the focal length to focus the laser beam at the first welding spot; holding the laser focal spot size constant; and directing the laser beam at a second welding spot after completion of welding for the first welding spot, wherein the predetermined speed of the laser welding unit is predetermined to be constant during welding for each welding spot.

14. The laser welding method as claimed in claim 13, wherein the predetermined speed of the laser welding unit is predetermined to be constant during overall operation of welding.

15. The laser welding method as claimed in claim 13, wherein the predetermined speed of the laser welding unit is predetermined to be higher than a welding speed for each welding spot.

16. The laser welding method as claimed in claim 13, wherein the travel trajectory of the laser welding unit is predetermined to extend along from the first welding spot to the second welding spot.

17. The laser welding method as claimed in claim 13, further comprising:

controlling the laser welding unit to travel to be in a backward position with respect to an initial welding spot along the travel trajectory of the laser welding unit at a start of welding for the initial welding spot, and to be in a forward position with respect to a final welding spot along the travel trajectory of the laser welding unit at an end of welding for the final welding spot.

* * * * *